United States Patent [19]

Sakurai

[11] Patent Number: 5,237,430
[45] Date of Patent: Aug. 17, 1993

[54] FACSIMILE APPARATUS WHICH STORES IMAGE DATA IN A BULK STORAGE DEVICE

[75] Inventor: Akira Sakurai, Kawasaki, Japan
[73] Assignee: Ricoh Company, Ltd., Tokyo, Japan
[21] Appl. No.: 687,744
[22] Filed: Apr. 19, 1991

[30] Foreign Application Priority Data

Apr. 20, 1990 [JP] Japan .................................. 2-104675
Apr. 20, 1990 [JP] Japan .................................. 2-104676

[51] Int. Cl.⁵ .............................................. H04N 1/00
[52] U.S. Cl. .................................... 358/444; 358/402
[58] Field of Search ...................... 358/444, 401–403, 358/407, 404

[56] References Cited

U.S. PATENT DOCUMENTS

| | | | |
|---|---|---|---|
| 4,970,603 | 11/1990 | Kanai .................................. | 358/401 |
| 4,994,926 | 2/1991 | Gordon et al. ...................... | 358/402 |
| 5,016,115 | 5/1991 | Calkins ............................... | 358/442 |
| 5,020,096 | 5/1991 | Sakakibara et al. ................. | 358/402 |
| 5,104,300 | 5/1991 | Harvath et al. ..................... | 358/407 |

FOREIGN PATENT DOCUMENTS

| | | |
|---|---|---|
| 54-34709 | 3/1979 | Japan . |
| 62-44458 | 9/1987 | Japan . |
| 62-296649 | 12/1987 | Japan . |
| 63-84256 | 4/1988 | Japan . |
| 63-176063 | 7/1988 | Japan . |
| 63-233648 | 9/1988 | Japan . |

*Primary Examiner*—Stephen Brinich
*Attorney, Agent, or Firm*—Oblon, Spivak, McClelland, Maier & Neustadt

[57] ABSTRACT

A facsimile apparatus stores image data transmitted from another facsimile apparatus to the facsimile apparatus in a corresponding image file table in a memory. The image data is correlated with the other facsimile apparatus in the image file table so that an image corresponding to the image data can be conveniently searched, permanently preserved, arranged, and erased. The image file table is automatically made every time the facsimile apparatus receives the image data from another facsimile apparatus.

27 Claims, 23 Drawing Sheets

| IMAGE FILE NAME | TIME | CSI OR TSI | T/R |
|---|---|---|---|
| FAX 0001 | 1990.01.09 11:21 | 034793111 | R |
| FAX 0002 | 1990.01.10 13:45 | 072753111 | T |
| | | | |

FIG. 8

| SEARCH | | | | No. 1234 |
|---|---|---|---|---|
| DOCUMENT NUMBER | TIME | TELEPHONE NUMBER | PAGE NUMBER | SELECTION KEY |
| ☐☐☐☐ | ☐☐☐☐☐☐ ☐☐☐☐ | ☐☐☐☐☐☐☐☐☐☐☐ | ☐☐☐ | ☐ |
| 3 | 89-08-25 13:15 | 03888 1111 | 016 | ○ |
| 32 | 89-08-29 10:23 | 03479 3111 | 001 | ○ |
| 66 | 89-09-30 16:32 | 03333 2222 | 020 | ○ |
| 447 | 89-10-11 09:28 | 04596 0111 | 013 | ○ |
| 569 | 89-12-07 15:46 | 04777 8888 | 003 | ○ |

▶ ◀

CONTENTS INDICATION KEY    SETUP KEY

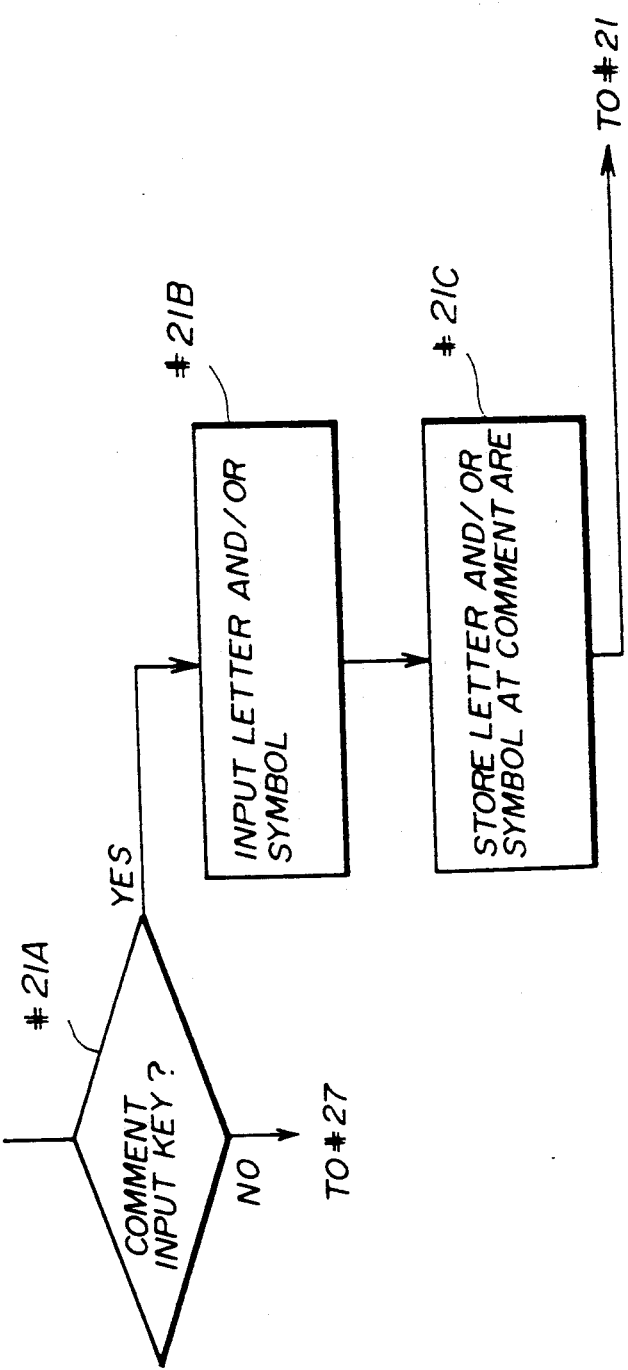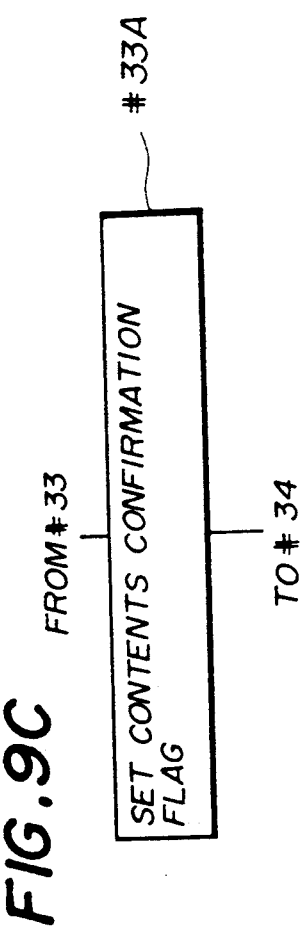

FIG.9E

| DOCUMENT NUMBER | SORT | CONTENTS CONFIRMATION | TIME | COMMENT | PAGE NUMBER |
|---|---|---|---|---|---|
| 0001 | 📋 | | 89-08-25 13:15 | PLAN DRAFT | 001 |
| 0002 | 📋 | | 89-08-25 13:15 | GOODS DEVELOPMENT PLAN | 999 |
| 0003 | 📋 | | 89-08-25 13:15 | PLAN MEETING REPORT DRAFT | 001 |
| 0004 | 📋 | | 89-08-25 13:15 | IDEA MEMORANDUM | 020 |
| 0005 | 📋 | | 89-08-25 13:15 | GOOD RESTAURANT | 010 |
| 0006 | 📋 | | 89-08-25 13:15 | GOODS DEVELOPMENT PLAN 2 | 003 |

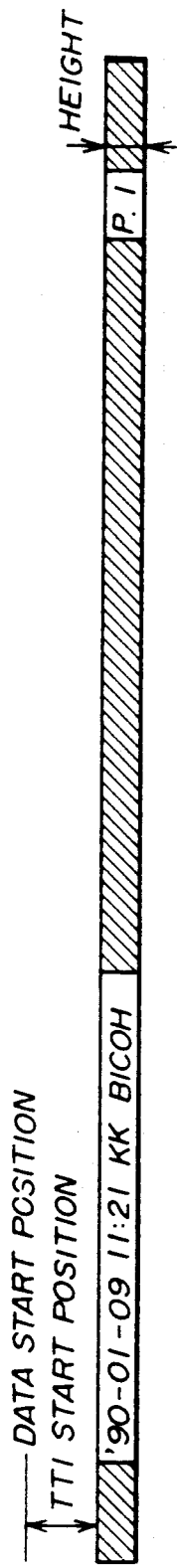

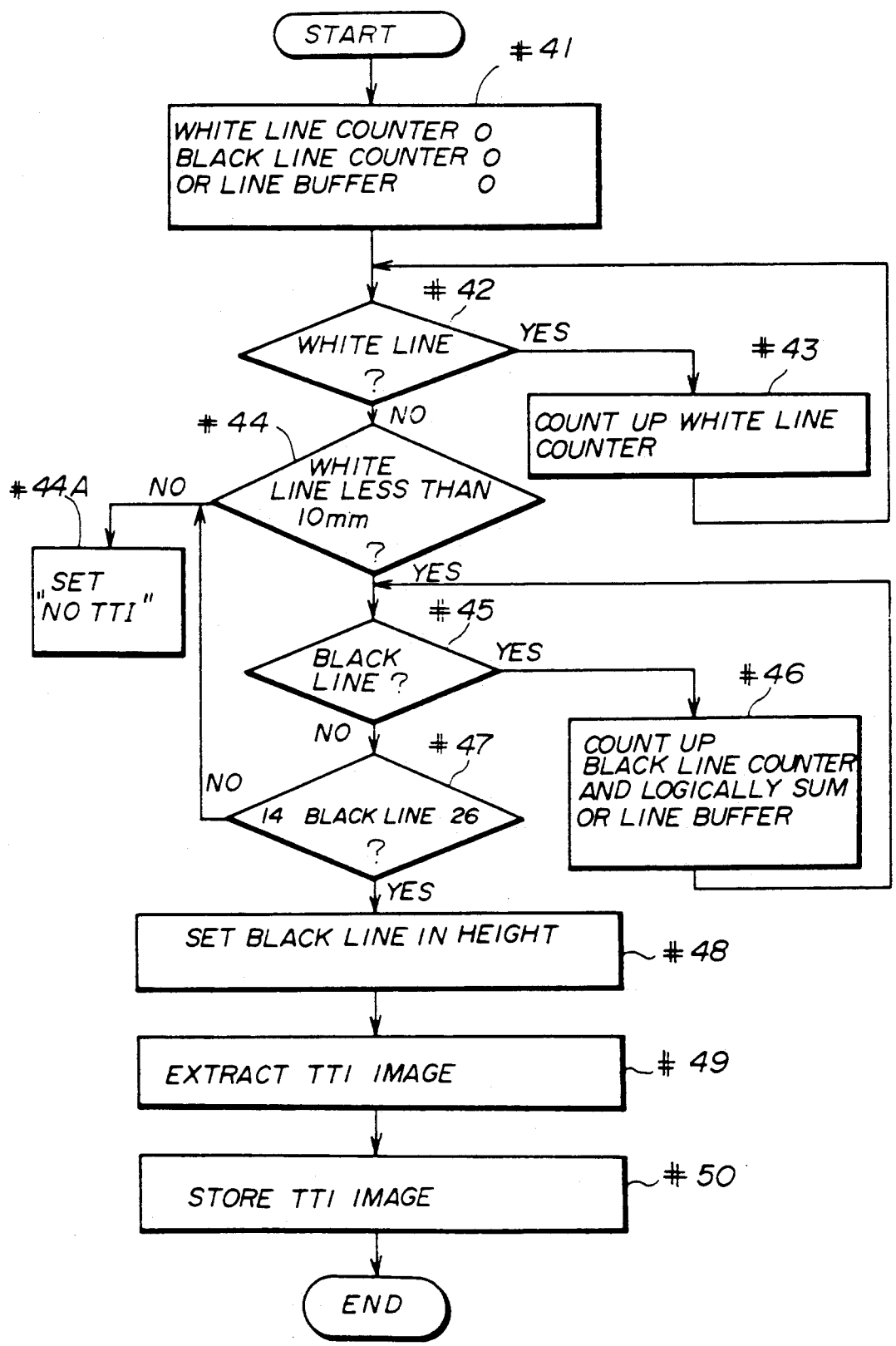

FIG. 15

| TEL | NAME |
|---|---|
| 034793111 | KK. BICOH |
| 072753111 | BICOH IKEDA |

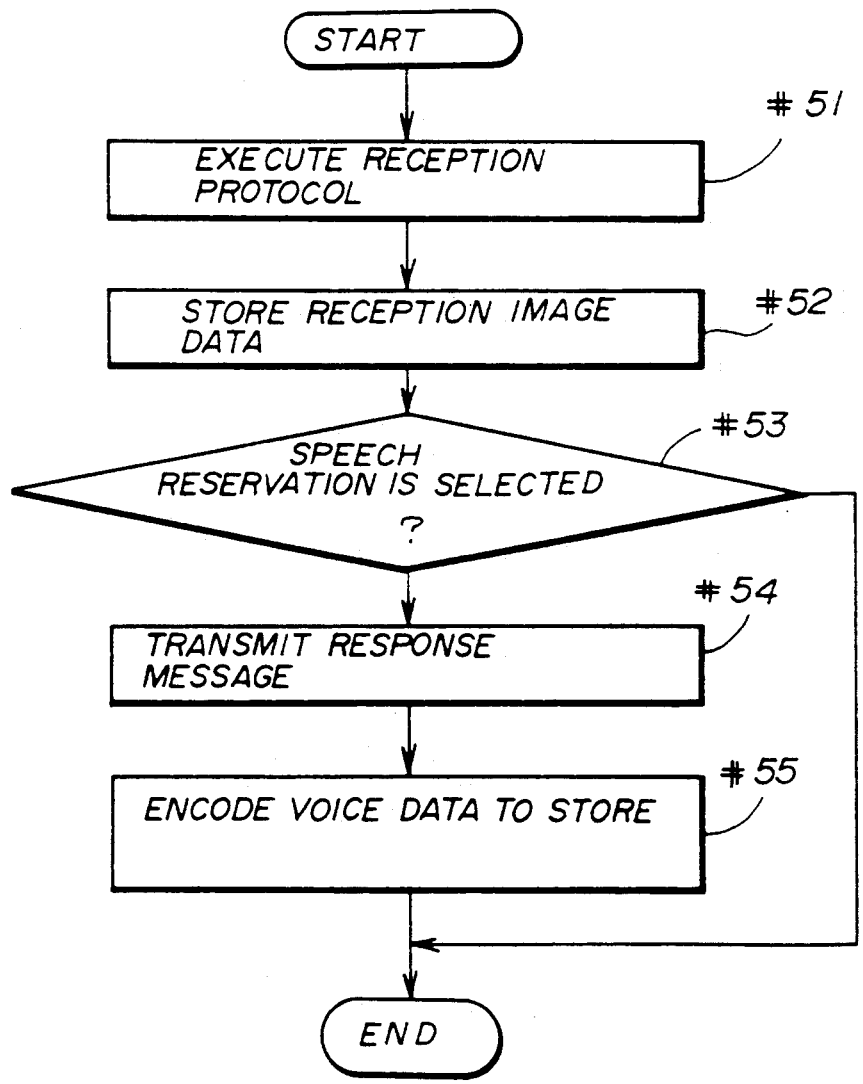

FIG.24

| SETUP NUMBER | TIME | IMAGE FILE NAME | VOICE DATA PRESENCE | CALLED PARTY TELEPHONE NUMBER |
|---|---|---|---|---|
| 1 | THIS TUESDAY 11:45 | SCN 0001 | O | 034793111 |
| 2 | NEXT MONDAY 8:50 | SCN 0003 | X | 034793111 |
| 2 | | SCN 0004 | X | |

FIG.25

| IMAGE DATA 1 | IMAGE DATA 2 | ---- | IMAGE DATA n | VOICE MESSAGE 1 | VOICE MESSAGE 2 | ---- | VOICE MESSAGE n |

# FACSIMILE APPARATUS WHICH STORES IMAGE DATA IN A BULK STORAGE DEVICE

BACKGROUND OF THE INVENTION

1. Field of the Invention

The present invention relates generally to facsimile apparatuses, and more particularly to a facsimile apparatus which stores image data in a bulk storage device.

2. Discussion of the Background

A conventional well-known facsimile apparatus (abbreviated FAX hereinafter) comprises a scanner, an encoder/decoder, a plotter, a memory, and a line controller. The memory comprises a semiconductor storage device or a hard disk. The semiconductor storage device has a relatively small storage capacity, and the hard disk has a relatively large storage capacity. The scanner scans a predetermined image on a document to generate an image signal representing the predetermined image. The image signal is encoded into image data by the encoder/decoder. The image data is temporarily stored in the memory in a FAX when, for example, the FAX transmits an outgoing call to another FAX which is communicating with still another FAX. The plotter prints out the predetermined image on a paper.

However, the above FAX is disadvantageous in that images are searched, permanently preserved, arranged, and erased on every sheet of paper. Incidentally, the word "manage" includes all the meanings of the above words, such as searching, permanently preserving, arranging, and erasing, hereinafter.

SUMMARY OF THE INVENTION

Accordingly, it is a general object of the present invention to provide a novel and useful facsimile apparatus in which the above disadvantage is eliminated.

Another object of the present invention is to provide a facsimile apparatus in which images can be conveniently managed.

The more specific object of the present invention is to provide a facsimile apparatus comprises scanning means for scanning a predetermined image on a document to generate an image signal representing the predetermined image, encoder/decoder means, coupled to the scanning means, for encoding the image signal into image data and for decoding the image data into the image signal, control means, coupled to the scanning means and encoder/decoder means, for controlling the connecting of the facsimile apparatus to another facsimile apparatus by transmitting and/or receiving a predetermined protocol information so that the image data is transmitted between the control means and the other facsimile apparatus, the predetermined protocol information including identification information of the facsimile apparatus and the other facsimile apparatus, plotter means, coupled to the control means, for plotting the predetermined image appropriate to the image data transmitted from the other facsimile apparatus to the control means, a memory which stores therein the image data transmitted from the other facsimile apparatus to the facsimile apparatus, image file table making means, coupled to the control means and memory, for automatically making an image file table in the memory by using at least the image data and the identification information of the other facsimile apparatus when the image data is transmitted from the other facsimile apparatus to the facsimile apparatus, in which the image file table the image data is correlated with the other facsimile apparatus, and image managing means, coupled to the memory, for managing the image data by using the image file table.

Another more specific object of the present invention is to provide a facsimile apparatus comprises scanning means for scanning a predetermined image on a document to generate an image signal representing the predetermined image, encoder/decoder means, coupled to the scanning means, for encoding the image signal into image data and for decoding the image data into the image signal, control means, coupled to the scanning means and encoder/decoder means, for controlling the connecting of the facsimile apparatus to another facsimile apparatus by transmitting and/or receiving a predetermined protocol information so that the image data is transmitted between the control means and the other facsimile apparatus, the predetermined protocol information including identification information of the facsimile apparatus and the other facsimile apparatus, plotter means, coupled to the control means, for plotting the predetermined image appropriate to the image data transmitted from the other facsimile apparatuses to the facsimile apparatus, a memory, coupled to the scanning means, which stores therein the image data generated by the scanning means, image file table making means, coupled to the control means and memory, for automatically making an image file table in the memory by using at least the image data and the identification information of the other facsimile apparatus when the image data is transmitted from the facsimile apparatus to the other facsimile apparatus, in which image file table the image data is correlated with the other facsimile apparatus, and image managing means, coupled to the memory, for managing the image data by using the image file table.

Still another object of the present invention is to provide a facsimile apparatus comprises scanning means for scanning a predetermined image on a document to generate an image signal representing the predetermined image, encoder/decoder means, coupled to the scanning means, for encoding the image signal into image data and for decoding the image data into the image signal, control means, coupled to the scanning means and encoder/decoder means, for controlling the connecting of the facsimile apparatus to another facsimile apparatus by transmitting and/or receiving a predetermined protocol information so that the image data is transmitted between the control means and the other facsimile apparatus, the predetermined protocol information including identification information of the facsimile apparatus and the other facsimile apparatus, plotter means, coupled to the control means, for plotting the predetermined image appropriate to the image data transmitted from the other facsimile apparatuses to the facsimile apparatus, a memory, coupled to the scanning means, which stores therein the image data generated by the scanning means and transmitted from the other facsimile apparatus to the facsimile apparatus, image file table making means, coupled to the control means and memory, for automatically making an image file table in the memory by using the identification information of the other facsimile apparatus when the image data is transmitted to and/or from the facsimile apparatus, in which the image file table the image data is automatically correlated with the other facsimile apparatus, and image managing means, coupled to the memory, for managing the image data by using the image file table.

According to the present invention, an image corresponding to an image data is conveniently managed in every image file table because of the image file table making means and image managing means.

Other objects and further features of the present invention will become apparent from the following description when read in conjunction with the accompanying drawings.

BRIEF DESCRIPTION OF THE DRAWINGS

FIGS. 4 to 6 show a procedure of the main controller when the facsimile apparatus transmits the image data;

FIGS. 7 to 9E show a procedure of the main controller when predetermined image data is searched;

FIGS. 11A–11B shows an example of a transmitter terminal identification image;

FIG. 12 shows another example of the image file table;

FIG. 13 shows a flowchart of the facsimile apparatus shown in FIG. 10 in a case where it extracts the TTI image;

FIG. 15 shows an example of a telephone number-communicatee's name table;

FIG. 17 shows an example of an image file-voice file table;

FIG. 18 shows a procedure of the main controller when the facsimile apparatus in FIG. 16 receives the image data;

FIG. 24 shows an example of time designated setup information; and

FIG. 25 shows an example of a relationship between the image and voice data transmission in the case shown in FIG. 24.

DESCRIPTION OF THE PREFERRED EMBODIMENTS

Figure 1:
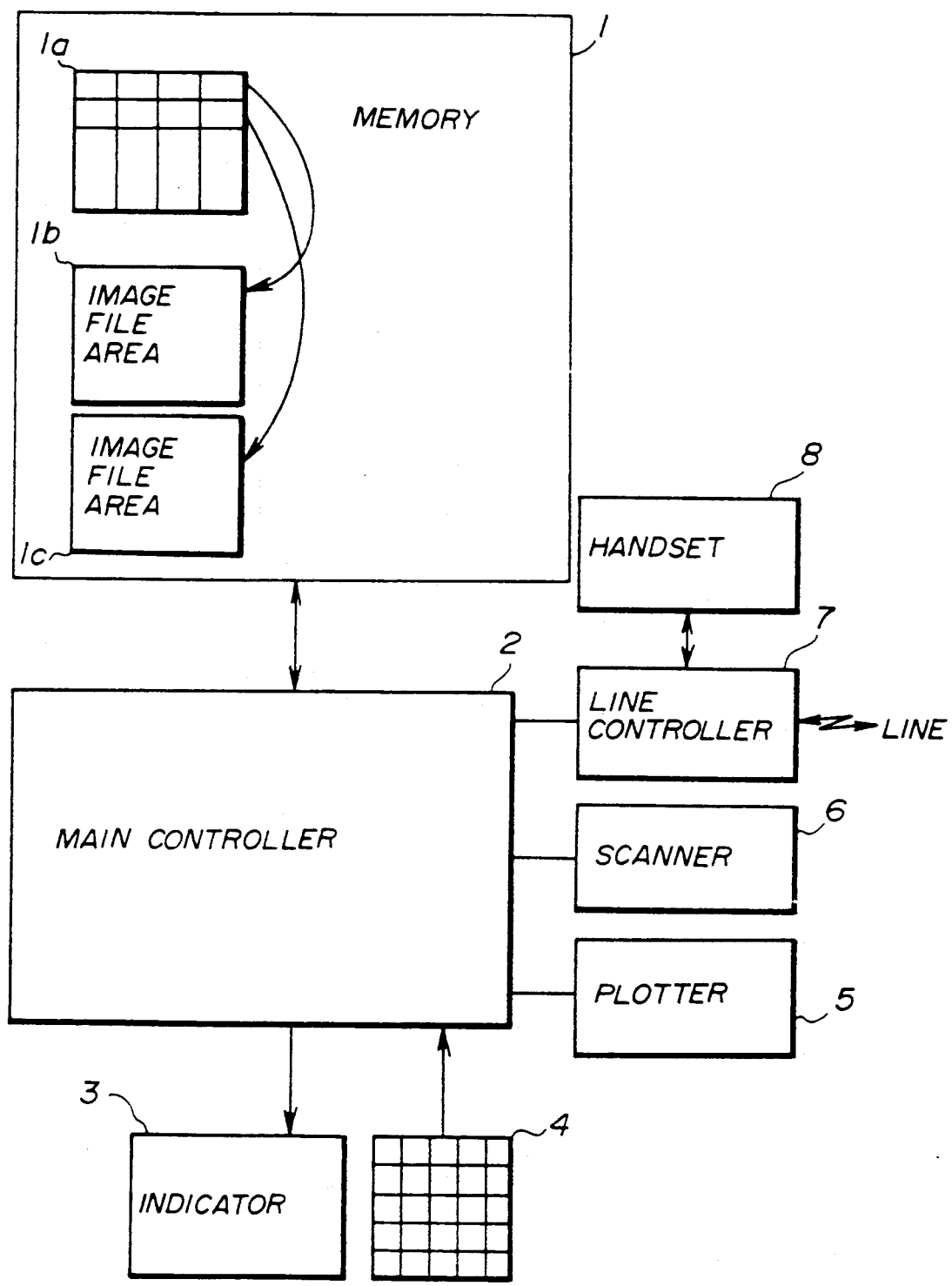
FIG. 1 shows a block diagram of a facsimile apparatus of a first embodiment according to the present invention.

The FAX of the first embodiment according to the present invention comprises, as shown in FIG. 1, a memory 1, a main controller 2, an indicator 3, an input device 4, a plotter 5, a scanner 6, a line controller 7, and a handset 8. This FAX further comprises an encoder/decoder (not shown). This FAX is a group 3 FAX. The memory 1 comprises an optical disk which functions as a bulk storage device. The main controller 2 is coupled to the memory 1, the indicator 3, the input device 4, the plotter 5, the scanner 6, and the line controller 7 which controls the above elements. In addition, the main controller 2 manages image data stored in the memory 1. The indicator 3 may comprise a liquid crystal display (abbreviated LCD hereinafter) or a cathode ray tube (abbreviated CRT hereinafter) display. The indicator 3 indicates the operation of this FAX and the image data. The input device 4 may comprise a keyboard, a menu screen by which the image data is indicated on the indicator 3, and a touch panel which detects the location of the image data. The plotter 5 prints out the predetermined image appropriate to the image data as a predetermined dot pattern. The line controller 7 controls the connecting of this FAX to another FAX so that the image data is transmitted therebetween. The handset 8 is coupled to the line controller 7.

According to this FAX, the image data which is transmitted between this FAX and the other FAX is correlated with the telephone number of the other FAX in an image file table and the time when the image data is transmitted. A user of this FAX can quickly search desired image data only if he/she inputs a telephone number and the time to this FAX. The image data comprises transmission image data transmitted from this FAX and reception image data transmitted to this FAX.

Figures 2, 3:
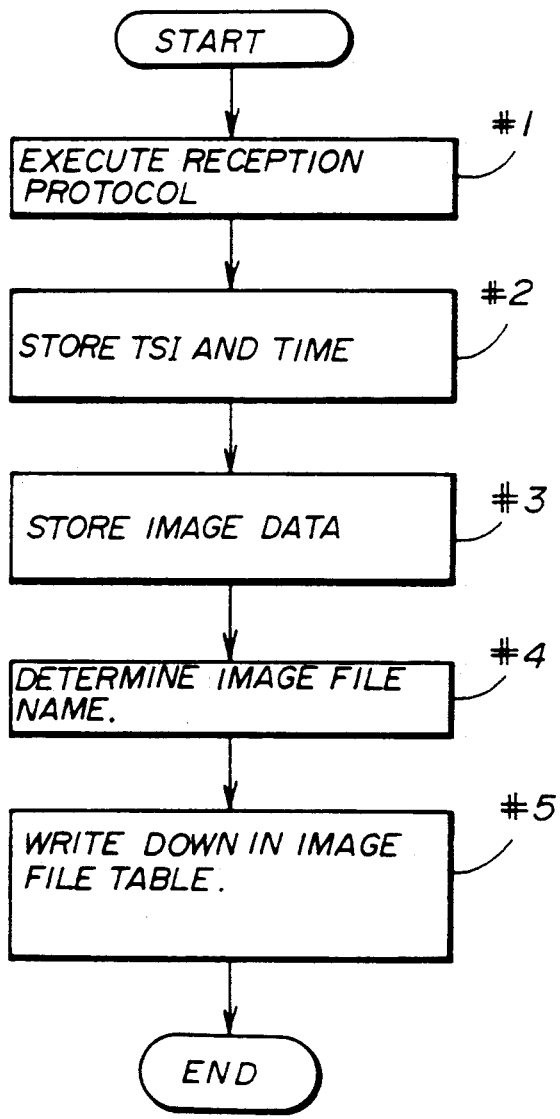
FIG. 2 shows an example of an image file table.
FIG. 3 shows a procedure of a main controller when the facsimile apparatus receives image data.

The storage area of the memory 1 comprises an image file table area 1a, and image file areas 1b and 1c. The image data is stored in the image file areas 1b and 1c. The image file table is stored in the image file table area 1a. Each image data is managed in every image file table. The image data transmitted from or to this FAX is stored in at least one of the image file areas 1b and 1c. However, as mentioned above, the transmission image data may be stored in the image file area 1b and the reception image data may be stored in the image file area 1c. Moreover, the memory may store either the transmission image data or the reception image data. As shown in FIG. 2, the image file table comprises the following items: "IMAGE FILE NAME", "TIME", "Called Station Identification (abbreviated CSI hereinafter) or Transmitting Station Identification (abbreviated TSI hereinafter)", and "Transmission/Reception (abbreviated T/R hereinafter)". The CSI and TSI are, as defined in CCITT T.30 procedures, the identification information specifying the other FAX to and/or from which the image data is transmitted from and/or to this FAX.

FIG. 3 shows a procedure of the main controller 2 when this FAX receives the image data. First, it executes a protocol for receiving the image data (in step #1), and temporarily preserves the TSI and the time in the memory 1 (in step #2). Subsequently, it stores the reception image data in the image file areas 1b and/or 1c (in step #3), and determines the image file name (in step #4). Lastly, it makes an image file table in the image file table area 1a by writing down the image file name, the TSI and the time which have been preserved in the step 2 in the image file table area 1a, and selecting the reception (abbreviated R hereinafter) from among the T/R item (in step #5). Thus, the reception image data is stored in the image file areas 1b and 1c, and the image file table thereof is made in the image file table area 1a.

Figure 4:
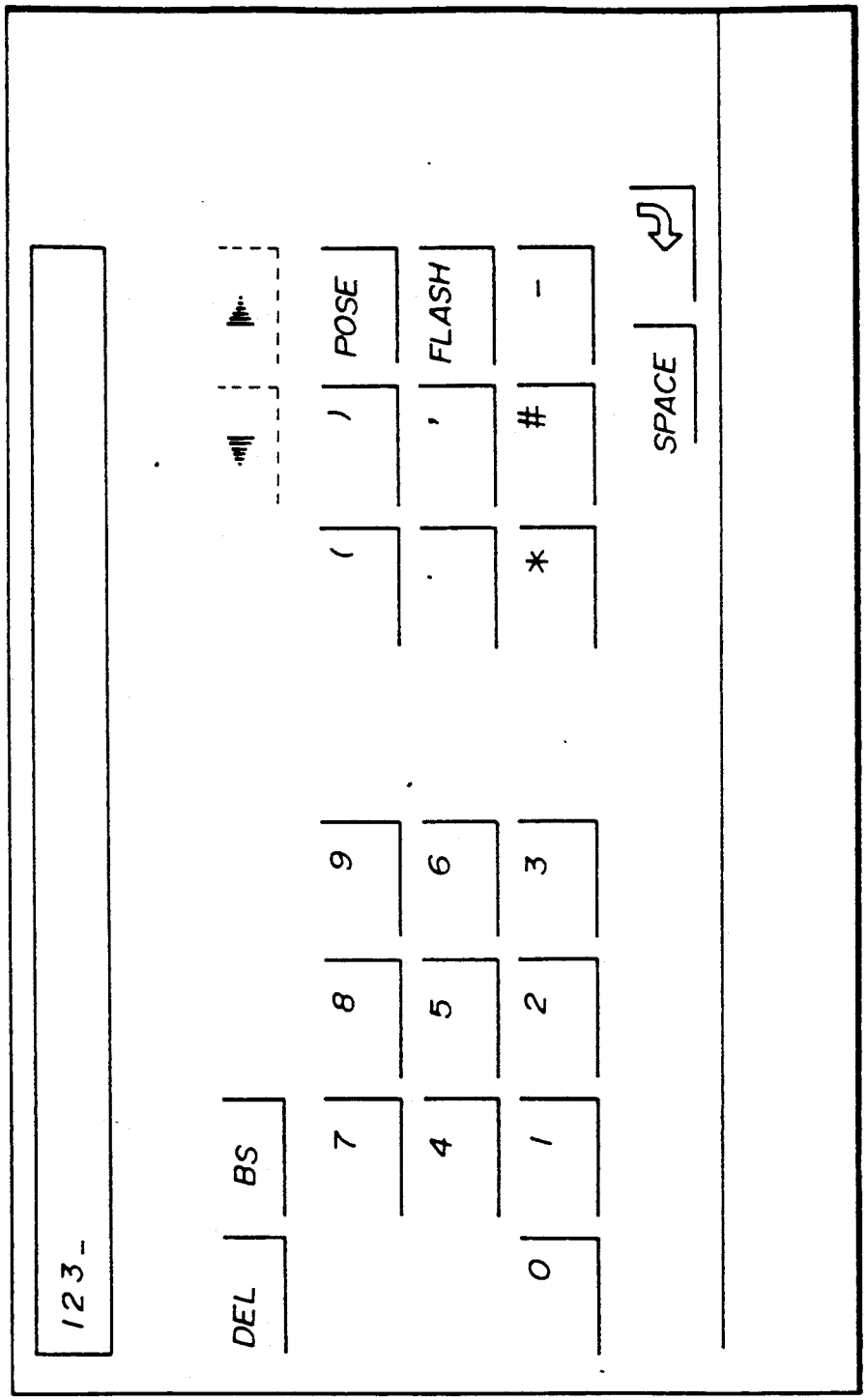
Figure 5:
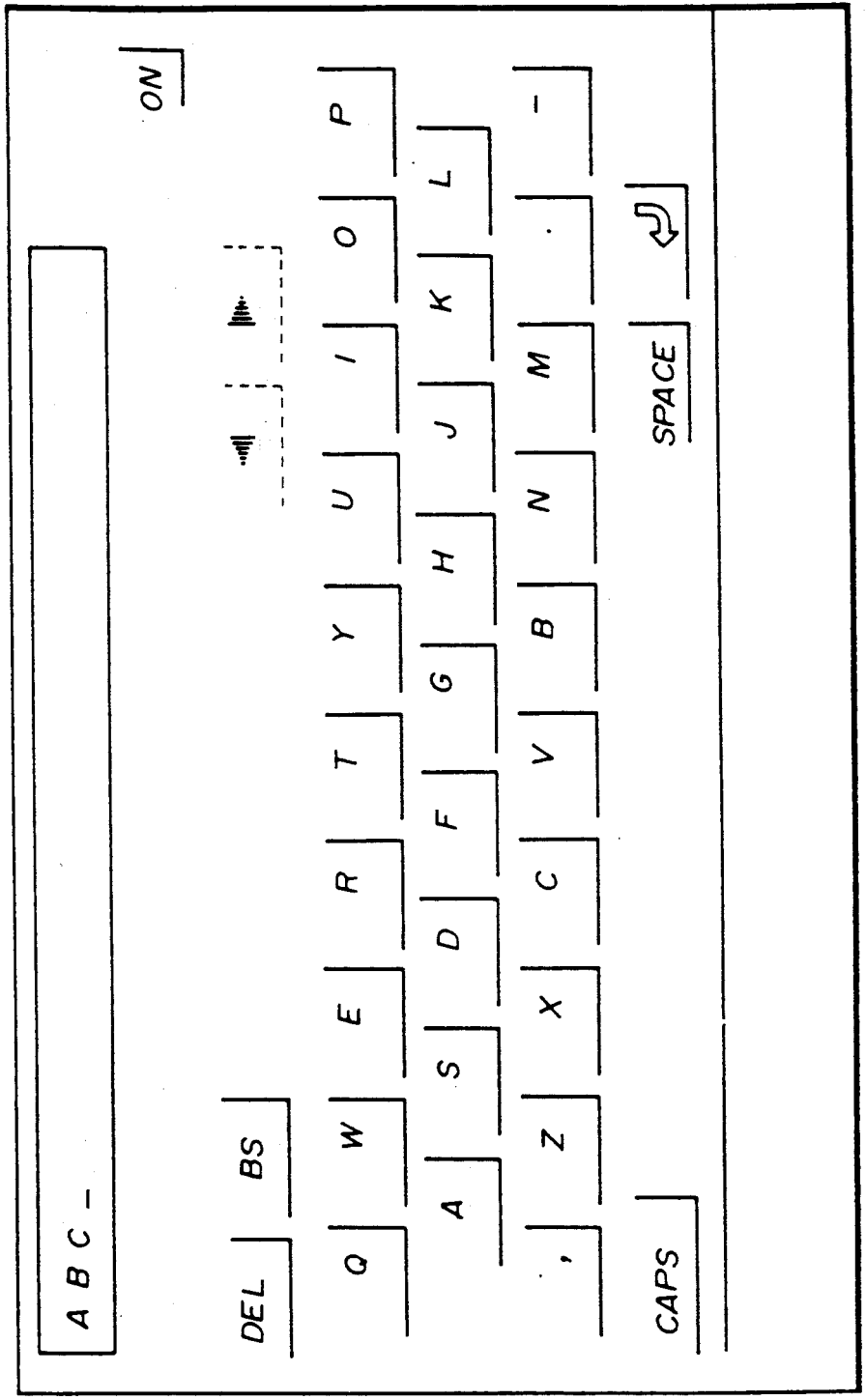
Figures 6, 7:
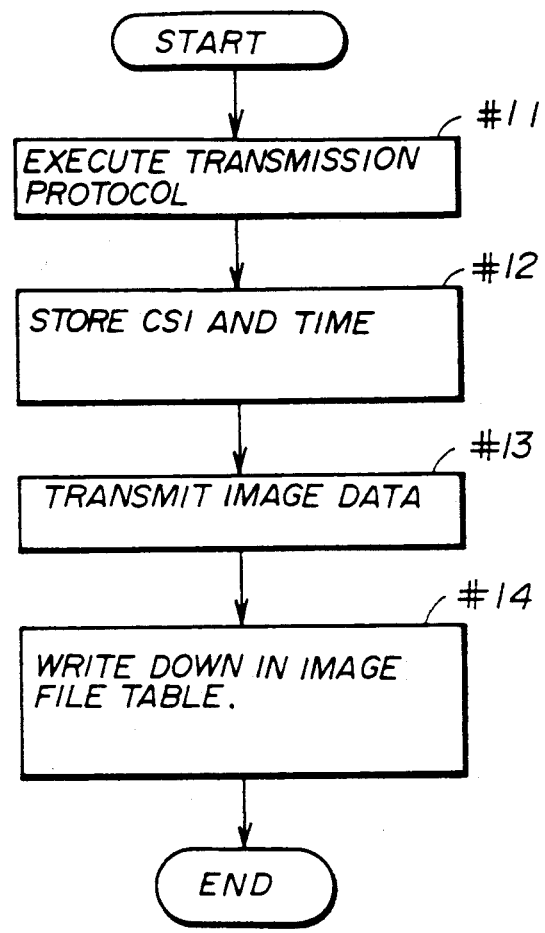

A description will now be given of a procedure of the main controller 2 when this FAX transmits the image data, with reference to FIGS. 4 to 6. The transmission image data generated by scanning and encoding a predetermined image is stored in the image file areas 1b and 1c. As shown in FIG. 6, first, the main controller 2 executes a protocol for transmitting the image data (in step #11), and temporarily preserves the CSI and the time in the memory 1 (in step #12). The CSI representing the communicatee's telephone number is inputted via a keyboard shown in FIG. 4. Next, the main controller 2 transmits the image data to the communicatee FAX (in step #13). Lastly, the main controller 2 makes the image file table by writing down the image file name, the CSI and the time which has been preserved in the step #12 in the image file table area 1a, and selecting the transmission (abbreviated T hereinafter) from among the T/R item. The image file name is also inputted by the user via a keyboard shown in FIG. 5. Thus, the transmission image data is stored in the image file areas 1b and 1c, and the image file table thereof is made in the image file table area 1a.

Figure 9A:
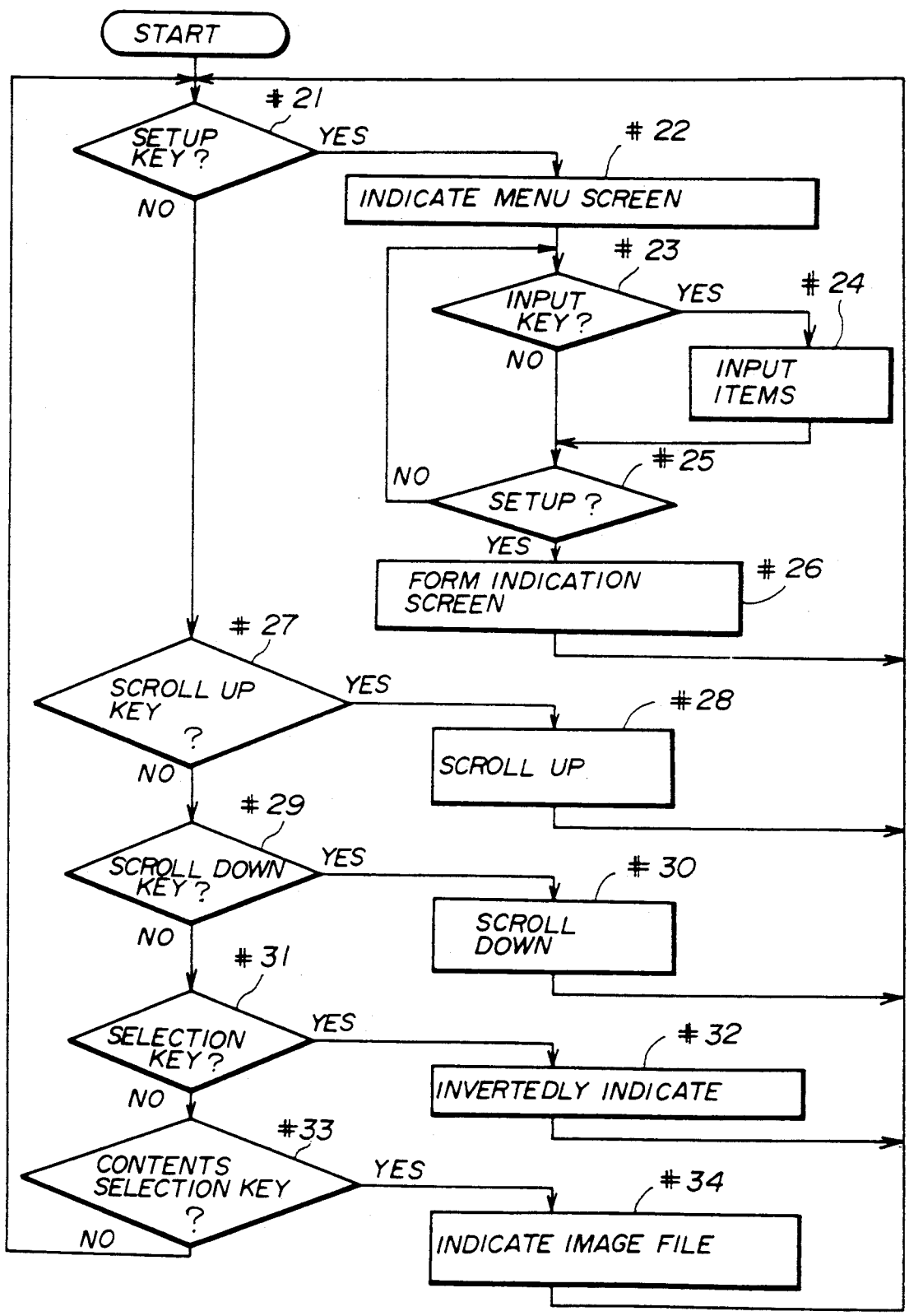

A description will now be given of a procedure of the main controller 2 when predetermined image data is searched with reference to FIGS. 7 to 9B. As shown in FIG. 9A, first, the main controller 2 judges whether or not a setup key shown in FIG. 8 is selected (in step #21). Hereupon, when this procedure is selected, for example, via the keyboard in FIG. 5, all pertinent image data are listed up on an indication screen shown in FIG. 8. The setup key is selected in order to limit the pertinent image data to be searched. If the setup key is selected, a menu screen appears as shown in FIG. 7 (in step #22). The menu screen requires searching terms to limit the pertinent image data to be searched. The menu screen may be indicated on a window of the screen shown in FIG. 4. The searching terms comprises the following: "STARTING TIME", "ENDING TIME" and "TELEPHONE NUMBER". However, whether or not inputting "TELEPHONE NUMBER" is inputted a matter of choice. An input key must be selected before these items are inputted,. Therefore, after the input key is selected, the above items are inputted via the keyboard show in FIG. 4 (in steps #23 and #24). When the above items are inputted, a setup key in FIG. 7 is selected (in step #25) and limited pertinent image data listed up as shown in FIG. 8 (in steps #26). Thus, the user can search the desired image data quickly because of a image file table. Incidentally, each document number in FIG. 8 represents the identification of the corresponding image data.

Figure 9D:
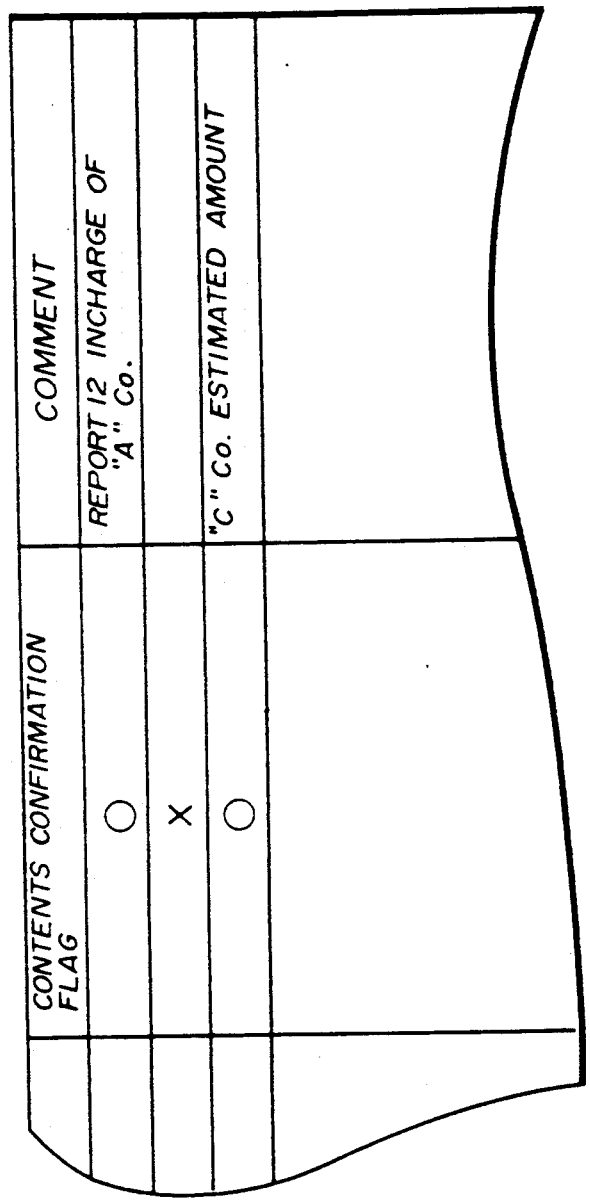

If the user does not select the setup key in FIG. 8, he/she must check all the pertinent image data listed up by scrolling up and/or down (in steps #27 to #30). If he/she selects a predetermined image data via a selection key, the selected image data is invertedly indicated (in steps #29 and #30). Moreover, he/she can know the contents of the selected image data via a contents indication key (in steps #33 and #34). FIG. 9B shows a procedure which modifies the above procedure so that the image data can be more easily found. In this modified FAX, the user can search the desired image data by means of a letter and/or symbol used for the image. That is, the main controller 2 judges whether or not the comment input key (not shown) is pushed in step #21A inserted between the steps #21 and #27. If the main controller 2 judges NO, the procedure is transferred to the step #27. However, if it judges YES, the user inputs the characteristic letter and/or symbol at a corresponding comment area (not shown) in the image file areas 1b and/or 1c via the keyboard shown in FIGS. 4 and/or 5 (in steps #21B and #21C). In addition, a step #33A representing setting a contents confirmation flag in the image file table may be inputted between the steps #33 and #34. That is, when the user inputs the predetermined letter and/or symbol, the contents confirmation flag is set as shown in FIGS. 9C and 9D. Hereupon, FIG. 9C shows another example of the image file table, and FIG. 9D shows another example of the indication screen. Thus, the image data can be searched more easily because of the comment input key operation.

Figure 10:
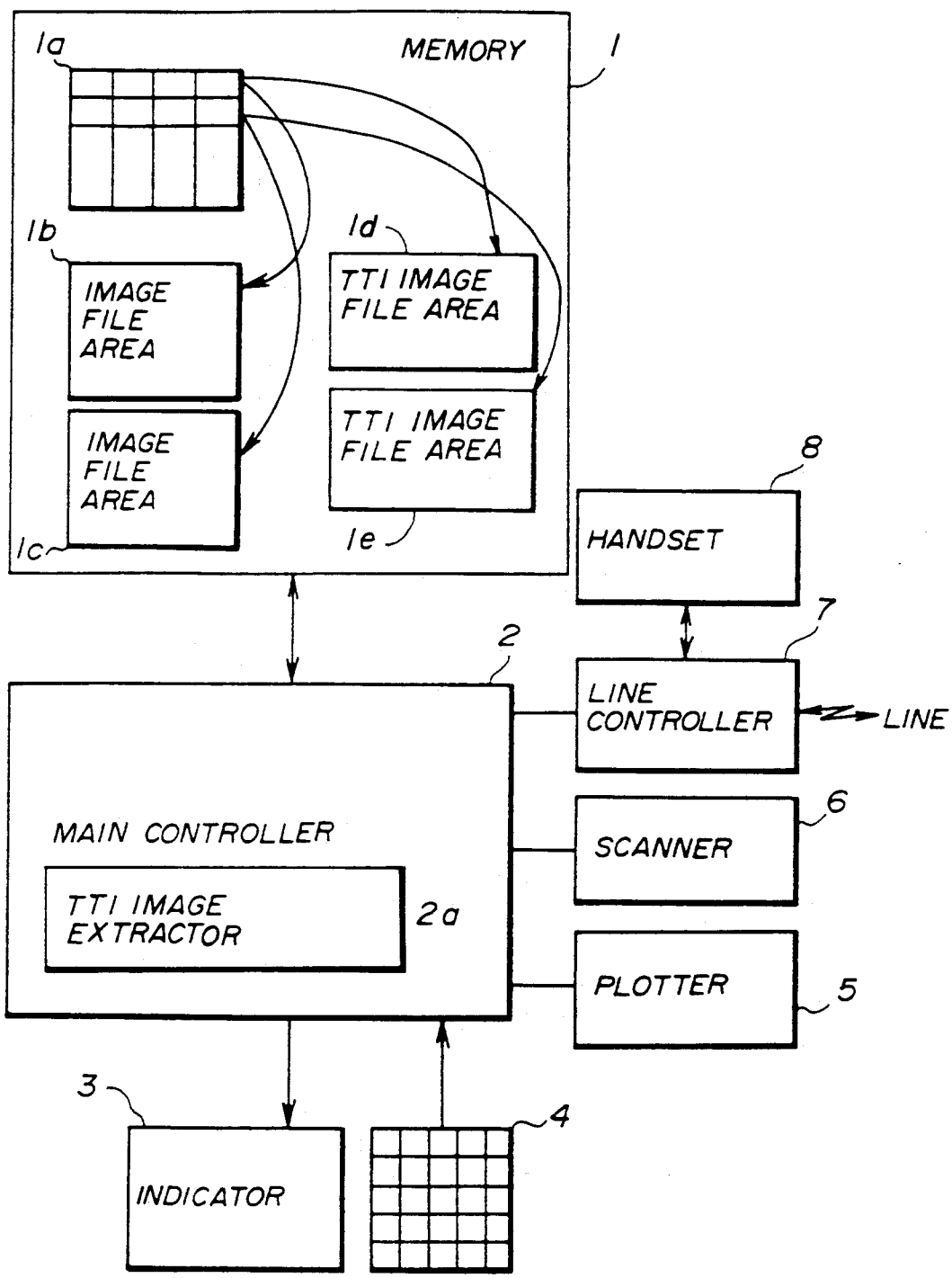
FIG. 10 shows a block diagram of a facsimile apparatus of a second embodiment according to the present invention.

A description will now be given of the FAX of the second embodiment according to the present invention. FIG. 10 shows a block diagram of this FAX. The elements which are the same as corresponding elements in FIG. 1 are designated by the same reference numerals, and a description thereof will be omitted. As shown in FIGS. 1 and 10, this embodiment differs from the first embodiment in that this FAX further comprises transmitter terminal identification (abbreviated TTI hereinafter) image file areas 1d and 1e in the memory 1 and a TTI image extractor 2a in the main controller 2. The TTI, a non-standard protocol, comprises time, name, and page information as defined in CCITT T.30.

The TTI image extractor 2a extracts an essential TTI image shown in FIG. 11B from the received TTI image shown in FIG. 11A by removing the blank part thereof, and makes a TTI image file in the TTI image file areas 1d and 1e. The TTI image is generated by a character generator, and the height thereof is about 16 dots. Hereupon, the character generator is means for generating dot image data corresponding to a predetermined character code. It is easier to search the desired image file if this TTI image file is used with the image file table 1a. When the TTI image file is extracted, non-blanked scan lines having respective 14–26 dot lengths are searched upon the assumption that noise size is 2 dots and the character generator size is 16–24 dots. If an image receiving start point is located within 1 cm from the top end of the paper, it is regarded as a TTI image to be detected. The blank part generally included in the TTI image is removed. The blank part having a height higher than that of the TTI image is removed from every scan line by means of the OR process. Thus, the blank part having "0" width can be easily detected.

In transmitting the image data, a receive terminal identification (abbreviated RTI hereinafter) or a predetermined name inputted by a key may be used. The RTI is a called terminal name expressed in 20 letters in non-standard facilities (abbreviated NSF hereinafter). Thus, because of the RTI or the predetermined name, the transmitted image can be preserved and searched as easily as the received image.

FIG. 12 shows another example of the image file table where an item of "TTI FILE CODE or NAME" is added to the image file table in FIG. 2. The TTI file name is stored in TTI image file areas 1d and 1e shown in FIG. 10, and is connected to a corresponding item stored in the image file table shown in FIG. 2 via a pointer. The "TTI FILE NAME" is selected during reception and the "NAME" is selected during transmission.

A description will now be given of a operation of the FAX when it extracts the TTI image, with reference to FIG. 13. First, a step #41 initializes white and black line counters and an OR line buffer in the TTI image extractor 2a at "0", and a step #42 judges whether or not it is the white line. If the step #42 judges YES, a step #43 counts up the white line counter and the procedure is transferred to the step #42. However, if the step #43 judges NO, a step #44 judges whether or not the white line is shorter than a predetermined length, for example, 10 mm. If the step #44 judges YES, a step #45 judges whether or not it is the black line. If the step #45 judges YES, a step #46 counts up the black line counter and executes the OR process with the contents of the OR line buffer, and then the procedure is fed back to the step #45. If the step #45 judges NO, a step #47 judges whether or not the number of the black lines is within 14–26. If the step #47 judges YES, a step #48 sets the number in the height thereof. Next, a step #49 extracts a part from the TTI image whose "0" part is higher than the height thereof. Lastly, a step #50 stores the extracted TTI image in the TTI image file table areas 1d and 1e. On the other hand, if the step #44 or #45 judges NO, a step #44A concludes "NO TTI".

Figure 14:
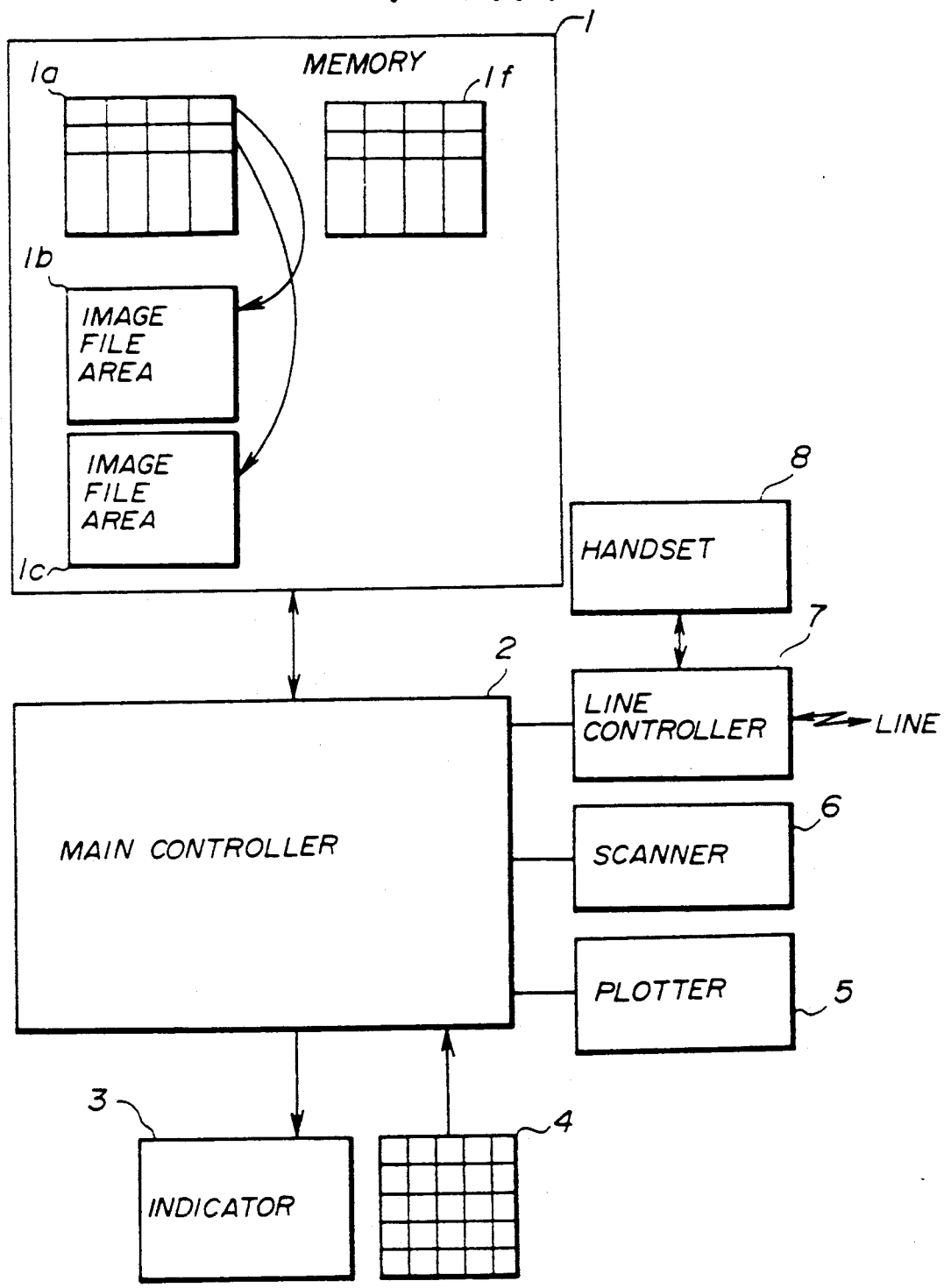
FIG. 14 shows a block diagram of a facsimile apparatus of a third embodiment according to the present invention.

A description will now be given of a FAX of the third embodiment according to the present invention with reference to FIG. 14. This FAX utilizes a communicatee telephone number obtained at the communication protocol, and converts the communicatee's name corresponding to the telephone number. Therefore, the image data with the communicatee's name can be searched. FIG. 14 shows a block diagram of this FAX. This FAX differs from that shown in FIG. 1 in that the telephone-communictee's name 1f shown in FIG. 15 can be stored in the memory 1 since most telephone numbers and communicatee's names are known by the FAX before the facsimile communication. Therefore, the communicatee telephone number item in FIG. 8 is replaced with the communicatee's name as shown in FIG. 15.

Figure 16:
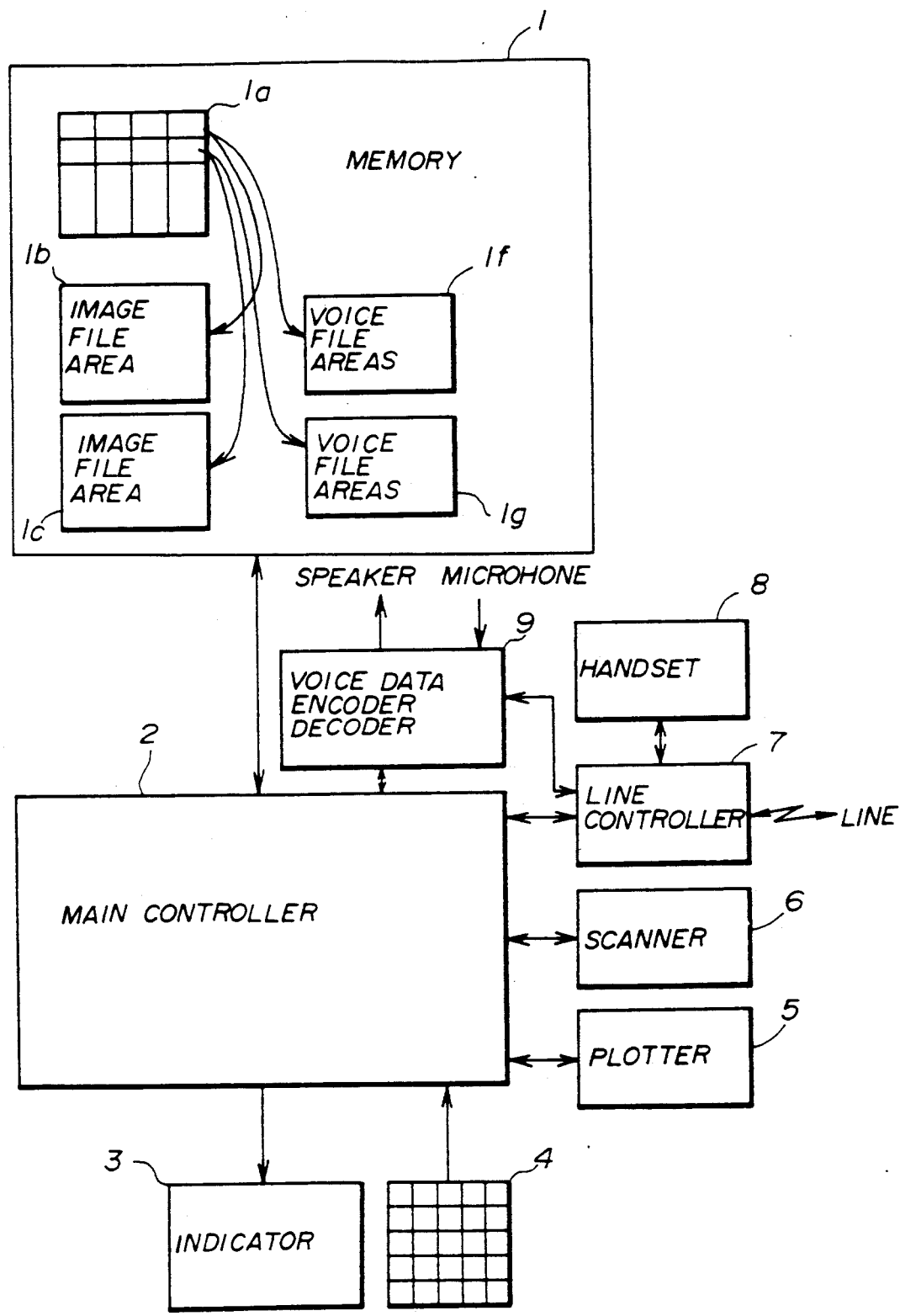
FIG. 16 shows a block diagram of a facsimile apparatus of a fourth embodiment according to the present invention.

A description will now be given of the FAX of the fourth embodiment according to the present invention. This FAX correlates the above image data with a voice data. In the conventional FAX having a answer phone function and/or a speech reservation function, it is difficult to correspond the voice data with the image data since they are respectively individually stored. As shown in FIG. 16, this FAX further comprises, unlike the FAX shown in FIG. 1, an image file-voice file table area 1a, a voice data encoder/decoder 9 coupled to a microphone, a speaker and the line controller 7, and a voice file areas 1f and 1g in the memory 1 in comparison with the FAX shown in FIG. 1. These elements in FIG. 16 which are the same as corresponding elements in FIG. 1 are designated by the same reference numerals, and a description thereof will be omitted. The image data-voice data table area 1a stores an image file-voice file table, as shown in FIG. 17. The first image file name "SCN 0001" represents a transmission image data with a voice data, and the second file name "FAX 0001" represents a reception image data without a voice data. The voice file name is written down when the FAX receives an image data with a voice data. The image data-voice data table correlates the image data with the voice data. The image file areas 1d and 1e store the voice data. The voice data encoder/decoder 9 encodes the voice data inputted from the handset into a corresponding digital data to store it in the voice file areas 1d and 1e, and decodes the digital data into the voice data to transmit it to the communicatee FAX. The user can hear the inputted voice data via the speaker.

FIG. 18 shows a procedure of the main controller 2 when this FAX receives the image data. First, the main controller 2 executes a protocol for receiving the image data (in step #51), and stores the reception image data in the image file areas 1b and/or 1c (in step #52). Subsequently, it judges whether or not a speech reservation function has been selected (in step #53). If it judges YES, then it transmits a response message, "Please input your message after the dial tone" (in step #54). Lastly, it encodes the voice data by means of ADPCM to store the encoded voice data in the voice file areas 1d and 1e (in step #55). The image file-voice file table is made in synchronization with this storing.

Figure 19:
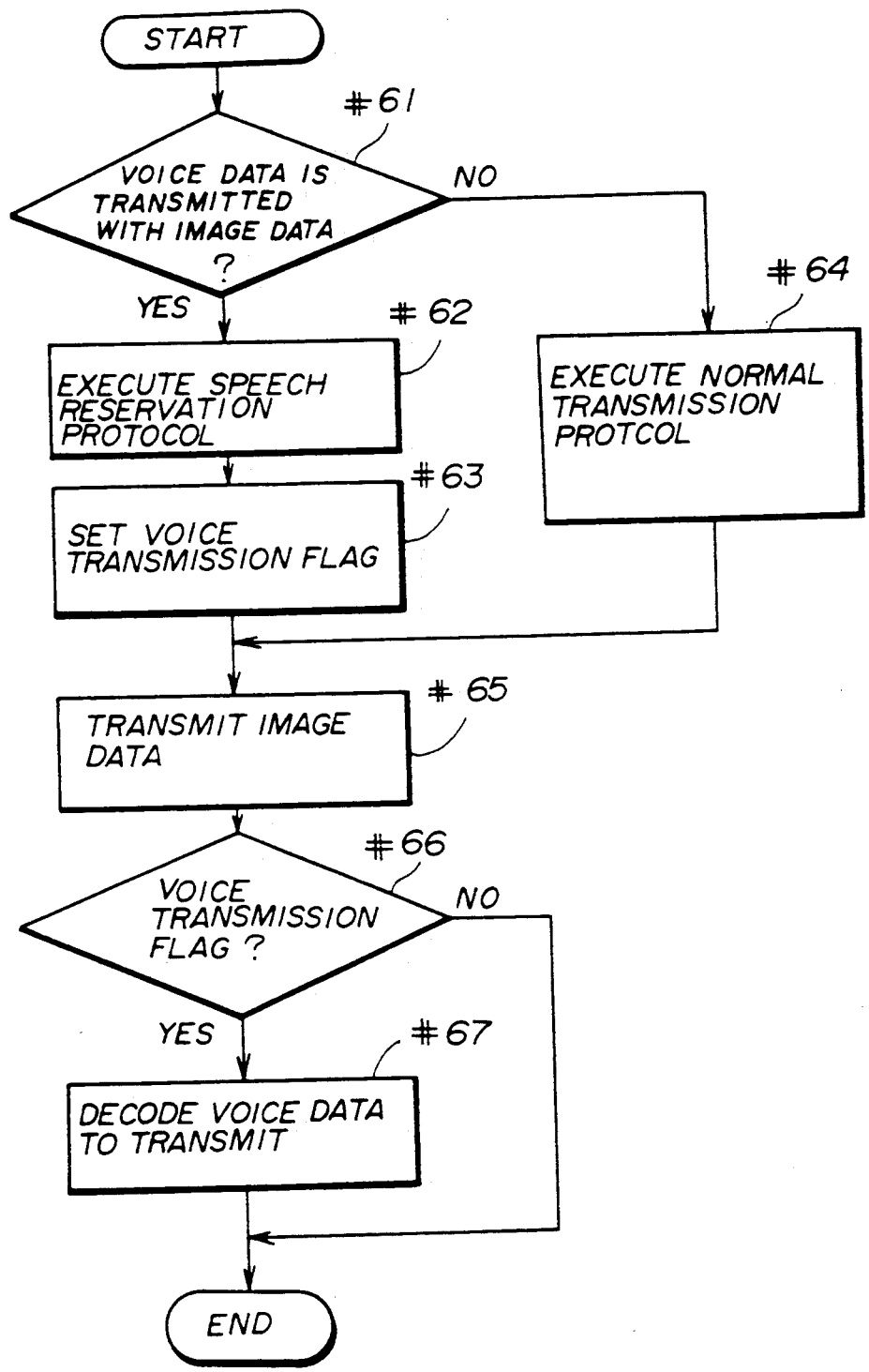
FIG. 19 shows a procedure of the main controller when the facsimile apparatus in FIG. 16 transmits the image data.

A description will now be given of a procedure of the main controller 2 when this FAX transmits the image data with reference to FIG. 19. First, this FAX judges whether or not the voice data is transmitted with the image data (in step #61). If it judges YES, it executes a speech reservation protocol (in step #62). Incidentally, the voice data has already been inputted via the microphone to be encoded by the voice data encoder/decoder 9, and stored in the voice file areas 1d and 1e. In addition, the voice data has already been correlated with the image data to be transmitted. The main controller 2 sets a voice transmission flag (in step #63), and transmits the image data (in step #65). On the other hand, if the main controller 2 judges NO in the step #61, it executes normal transmission protocol as mentioned in the step #11 shown in FIG. 6 (in step #64) and transmits only the image data (in the step #65). Then, the main controller 2 judges whether or not the voice transmission flag has been set (in step #66). If it judges NO, it terminates the procedure. However, if it judges YES, it calls the user. Subsequently, the main controller 2 reads out and decodes the corresponding voice data to transmit the data to the communicatee FAX via the line controller 7 (in step #67). Incidentally, if the communicatee FAX functions as this FAX, the encoded voice data can be transmitted.

Figure 20:
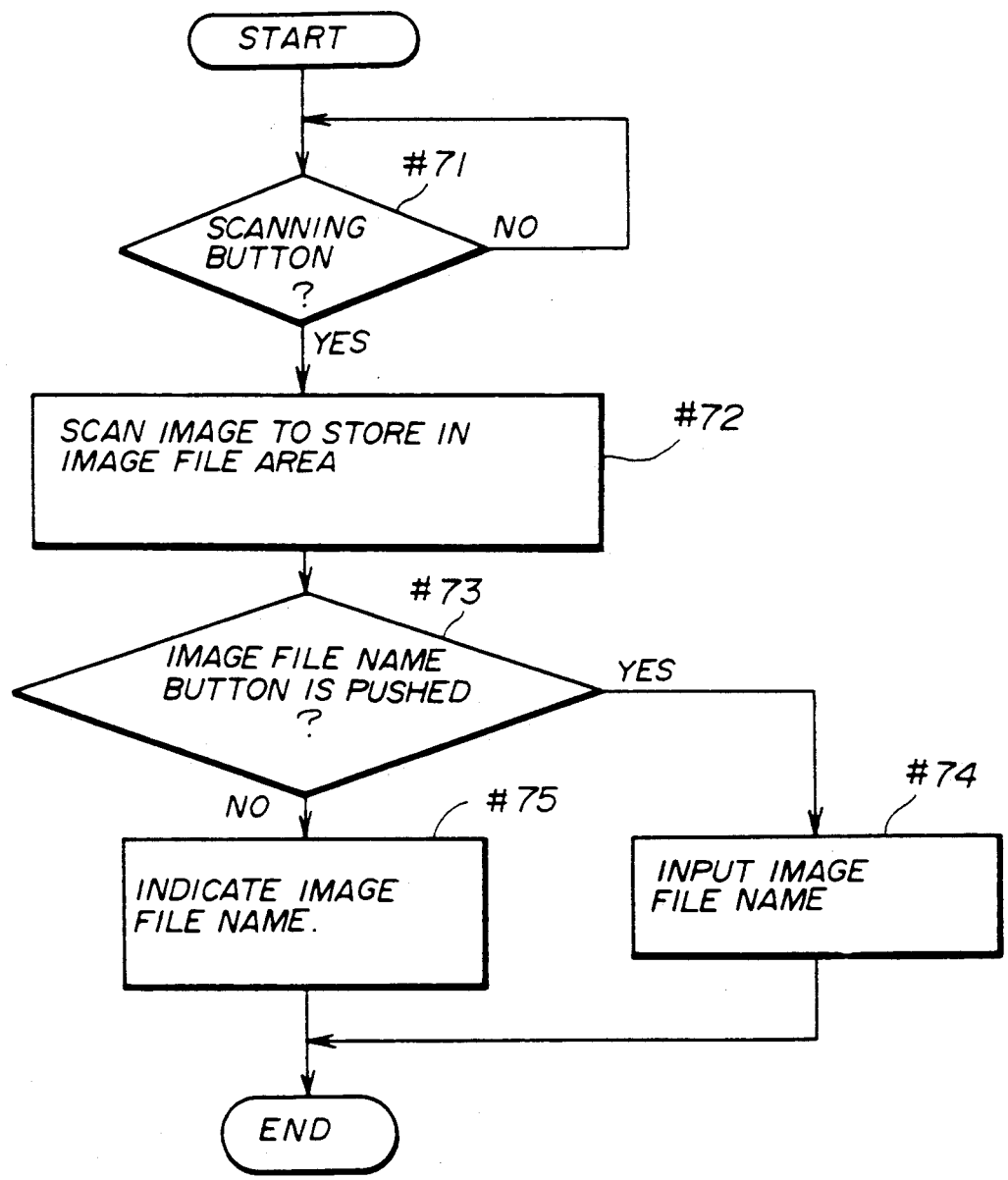
FIG. 20 shows a procedure of the main controller when the image data is inputted to the facsimile apparatus in FIG. 16.

A description will now be given of a procedure of the main controller 2 when the image data is inputted to this FAX, with reference to FIG. 20. First, the main controller 2 monitors if a scanning button is pushed (in step #71). If the scanning button is pushed, the scanner scans the predetermined image on a document to generate a image signal. The image signal is encoded, as mentioned above, by the encoder/decoder (not shown) into the image data. The image data is stored in the image file areas 1b and/or 1c (in step #72). Subsequently, the main controller 2 judges whether or not an image file name button is pushed (in step #73). If the image file name button is pushed, the image file name, as shown in FIGS. 2, 12 and 17, is inputted (in step #74) via the keyboard shown in FIGS. 4 and 5. On the other hand, if the main controller 2 judges NO, a sequential image file name which is predetermined by the main controller 2 is indicated on the indicator 3 (in step #75).

Figure 21:
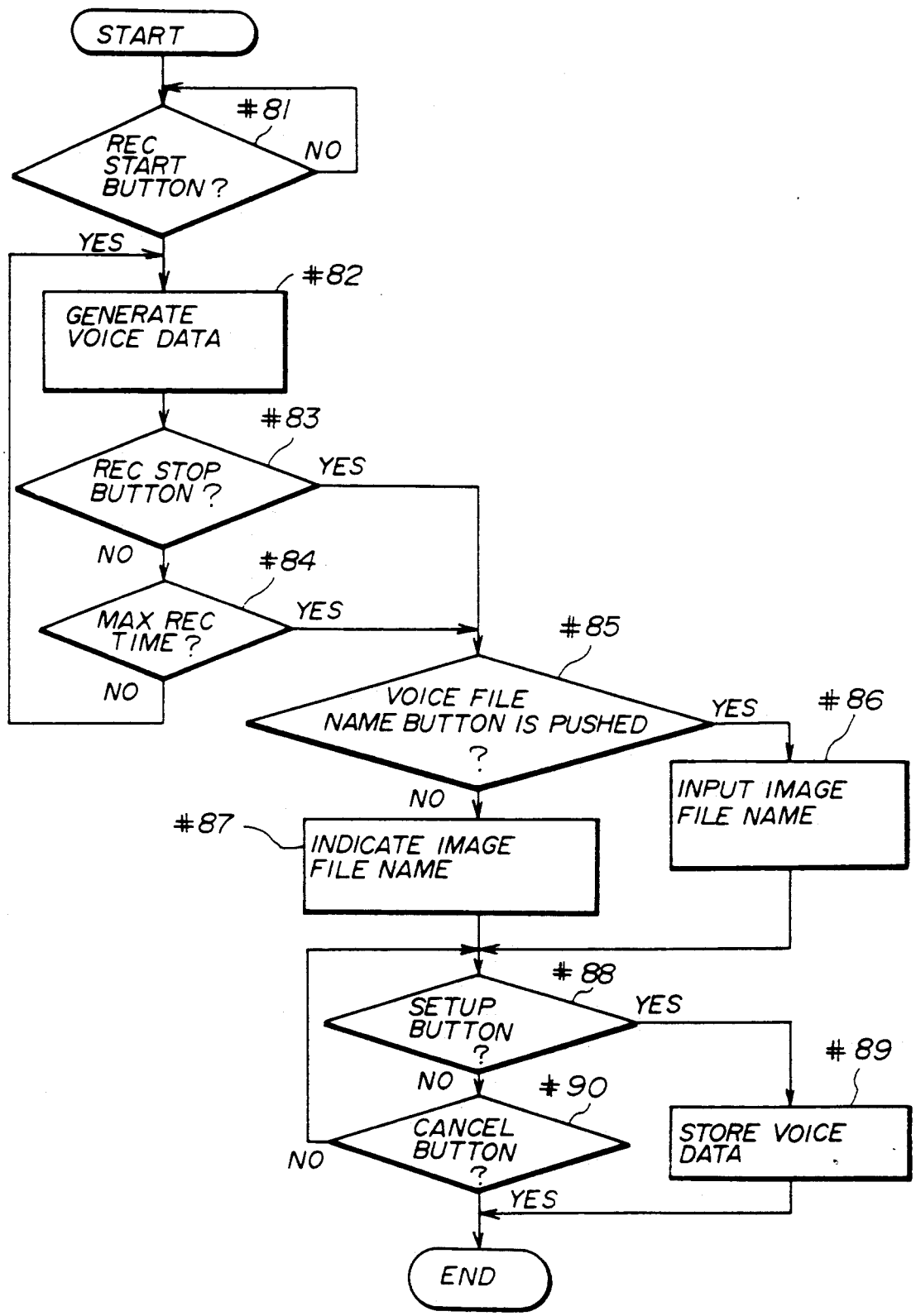
FIG. 21 shows a procedure of the main controller when the voice data is stored in the facsimile apparatus in FIG. 16 a facsimile apparatus shown in FIG. 16.
Figure 22:
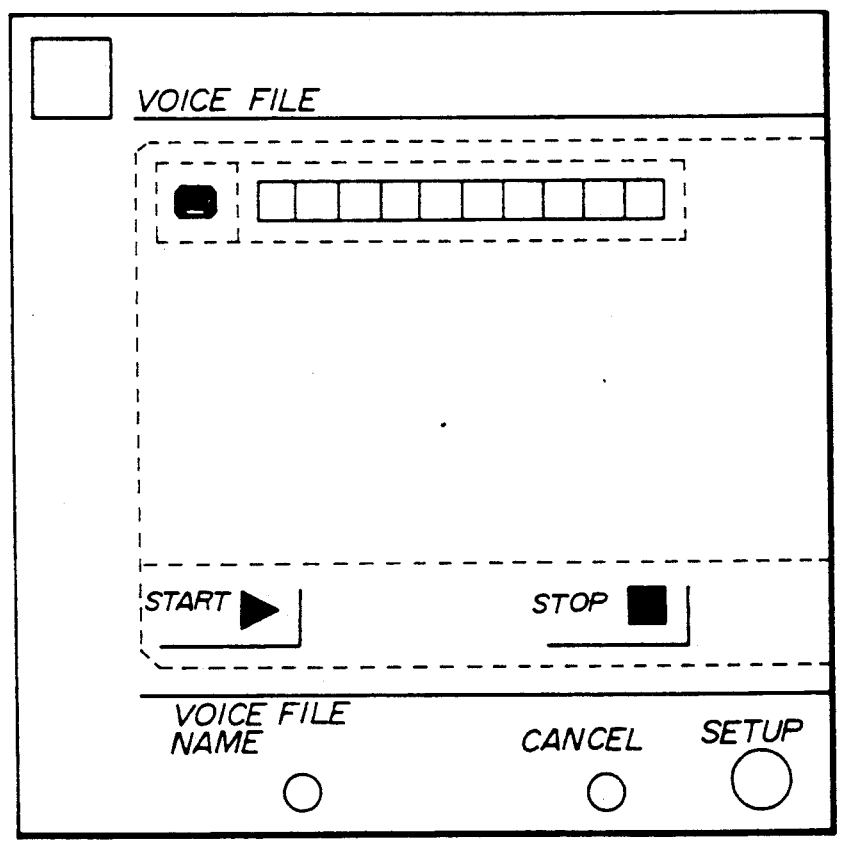
FIG. 22 shows an example of a keyboard used for the procedure in FIG. 21.

A description will now be given of a procedure of the main controller 2 when the voice data is stored in this FAX, with reference to FIGS. 21 and 22. FIG. 22 shows an example of a keyboard used for the above procedure. This keyboard comprises recording start and stop buttons, cancel and setup buttons, and a voice file name input button. First, the main controller 2 monitors the pushing of the recording start button (in step #81). If the recording start button is pushed, a voice is inputted and encoded via the microphone and the voice data encoder/decoder 9 (in step #82). The voice data generating continues until the recording stop button is pushed or a maximum recording time is passed (in steps #83 and #84). If the recording stop button is pushed or the maximum recording time is passed, the main controller 2 judges whether or not the voice file name button is pushed (in step #85). If the voice file name button is pushed, the voice file name is inputted (in step #86) via the keyboard shown in FIGS. 4 or 5. On the other hand, if the main controller 2 judges NO in step #85, a sequential voice file name which is predetermined by the main controller 2 is indicated on the indicator 3 (in step #87). The user determines and stores the voice file name (in steps #88 to #90) via the setup and cancel buttons in the keyboard shown in FIG. 22, and then stores the voice data (in step #89).

Figure 23:
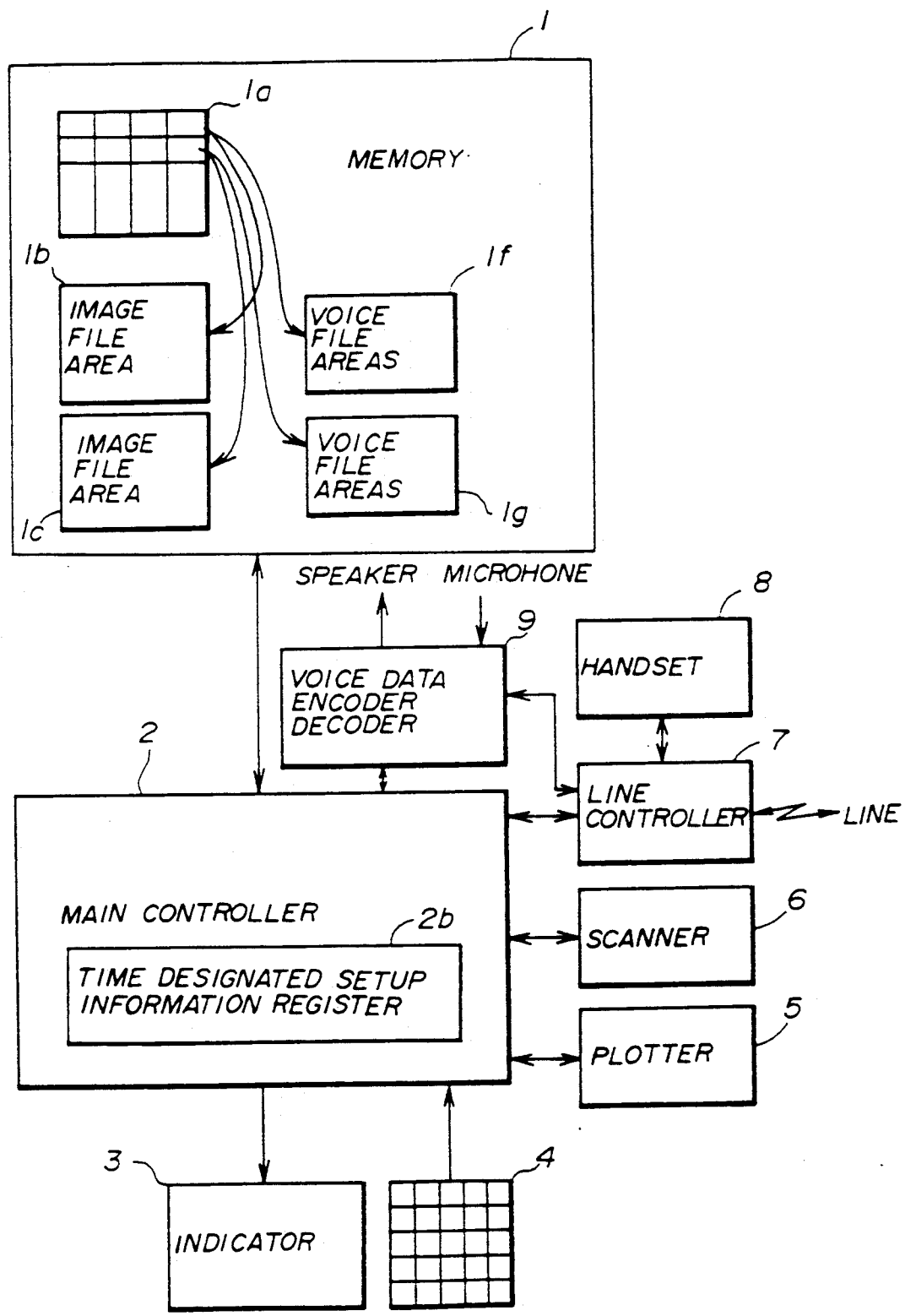
FIG. 23 shows a block diagram of a facsimile apparatus of a fifth embodiment according to the present invention.

A description will now be given of the FAX of the fifth embodiment according to the present invention with reference to FIGS. 23 to 25. This FAX further correlates time designated setup information with the image and voice data. As shown in FIG. 23, this FAX further comprises a time designated setup information register 2b in the main controller 2. Those elements in FIG. 23 which are the same as corresponding elements in FIG. 16 are designated by the same reference numerals, and a description thereof will be omitted. Because of the time designated setup information, the image and voice data can be transmitted at the time designated. The time designated setup information comprises, as shown in FIG. 24, "SETUP NUMBER", "TIME", "IMAGE FILE NAME", "VOICE DATA PRESENCE", and "CALLED PARTY TELEPHONE NUMBER". If there are a plurality of files having the same setup number "2", as shown in FIG. 24, the main controller 2 calls the user after the image data is transmitted to encode and transmit voices. In this case, as shown in FIG. 25, the image data is first sequentially transmitted and then the voice data is sequentially transmitted. Therefore, just one communication procedure can achieve the transmission of a plurality of files.

Further, the present invention is not limited to these preferred embodiments, but various variations and modifications may be made without departing from the scope of the present invention.

What is claimed is:

1. A facsimile apparatus comprising:
    scanning means for scanning a predetermined image on a document to generate an image signal representing the predetermined image;
    encoder means, coupled to said scanning means, for encoding the image signal into image data;
    control means, coupled to said scanning means and said encoder means, for controlling a connecting of said facsimile apparatus to another facsimile apparatus by at least one of transmitting and receiving predetermined protocol information so that the image data is transmitted between said control means and the other facsimile apparatus, the predetermined protocol information including identification information of said facsimile apparatus and the other facsimile apparatus;
    plotter means, coupled to said control means, for plotting an image of image data transmitted from the other facsimile apparatus to said control means;
    a memory which stores therein the image data transmitted from the other facsimile apparatus to said facsimile apparatus;
    image file table making means, coupled to said control means and the memory, for automatically making an image file table in said memory by using at least the image data and the identification information of the other facsimile apparatus when the image data is transmitted from the other facsimile apparatus to said facsimile apparatus, in which the image file table and the image data are correlated with the other facsimile apparatus; and
    image managing means, coupled to said memory for managing the image data by using the image file table.

2. A facsimile apparatus according to claim 1, wherein said memory can be exchanged.

3. A facsimile apparatus according to claim 1, wherein said memory comprises an optical 4. A facsimile apparatus according to claim 1, wherein the identification information includes a telephone number of the other facsimile apparatus, and said image file making means correlates the image data with the telephone number of the other facsimile apparatus.

5. A facsimile apparatus according to claim 1, wherein said image file making means further correlates the image data with a time when the image data is to be transmitted, the protocol information including first information regarding the time.

6. A facsimile apparatus according to claim 1, wherein the protocol information includes first information regarding whether the image data is transmitted from said facsimile apparatus to the other facsimile apparatus or from the other facsimile apparatus to said facsimile apparatus, and said image file making means correlates the image data with the first information.

7. A facsimile apparatus according to claim 1, wherein said image managing means searches a desired image by means of searching the image data corresponding to the desired image via the image file table.

8. A facsimile apparatus according to claim 1, wherein said image managing means permanently preserves the image in every image file table.

9. A facsimile apparatus according to claim 1, wherein said image managing means arranges the image by arranging the image file table.

10. A facsimile apparatus according to claim 1, wherein said image managing means erases the image by erasing the image file table.

11. A facsimile apparatus according to claim 1, wherein the identification information comprises at least one of a called station identification and a transmitting station identification which are defined by Comite Consultatif International Telegraphique et Telephonique.

12. A facsimile apparatus according to claim 1, wherein the identification information comprises at least one of a transmitter terminal identification and a receive terminal identification which are defined by Comite Consultatif International Telegraphique et Telephonique.

13. A facsimile apparatus according to claim 1, wherein said facsimile apparatus further comprises an indicator on which the image file table can be indicated.

14. A facsimile apparatus according to claim 13, wherein said indicator indicates the image file table by means of a bit map pattern.

15. A facsimile apparatus according to claim 4, wherein said image managing means searches a desired image by means of searching the image data corresponding to the desired image via the image file table, and said image managing means searches the image data by means of specifying the telephone number of the other facsimile apparatus.

16. A facsimile apparatus according to claim 5, wherein said image managing means searches a desired image by means of searching the image data corresponding to the desired image via the image file table, and said image managing means searches the image data by means of specifying the time.

17. A facsimile apparatus according to claim 1, wherein said image file making means further correlates the image data with at least one of a characteristic letter and a symbol included in the image corresponding to the image data.

18. A facsimile apparatus according to claim 17, wherein said image managing means searches a desired image by means of searching the image data corresponding to the desired image via the image file table, and said image managing means searches the image data by means of specifying at least one of the characteristic letter and the symbol.

19. A facsimile apparatus according to claim 7, wherein said image managing means searches the image data from among all the image file tables by means of scrolling up and/or down operations.

20. A facsimile apparatus according to claim 12, wherein said facsimile apparatus further comprises:
extractor means, responsive to said control means, for extracting the transmitter terminal identification by using a height and location of the image data; and
detecting means, responsive to said extractor means, for detecting a blank part more than a predetermined length included in the transmitter terminal identification extracted by said extractor means.

21. A facsimile apparatus according to claim 20, wherein said image managing means searches a desired image by means of searching the image data corresponding to the desired image via the image file table, and wherein said image managing means searches the image data by means of specifying the transmitter terminal identification extracted by said extractor.

22. A facsimile apparatus according to claim 4, wherein said facsimile apparatus further comprises a telephone number-communicatee's name table in said memory which shows the relationship between the telephone number and the other facsimile apparatus, and said image file making means correlates the image data with the telephone number of the other facsimile apparatus by using the telephone number-communicatee's name table.

23. A facsimile apparatus according to claim 1, wherein a voice can be transmitted between said facsimile apparatus and the other facsimile apparatus, and said facsimile apparatus further comprises voice data encoder/decoder means for encoding the voice into voice data and decoding the voice data into the voice, the voice data being stored in said memory, and wherein said image file table making means further correlates the image data with the voice data.

24. A facsimile apparatus according to claim 23, wherein said facsimile apparatus further comprises speech reservation means for allowing the voice to be transmitted from the other facsimile apparatus to said facsimile apparatus, and said image file making means making the image file table in response to said speech reservation means.

25. A facsimile apparatus according to claim 23, wherein said facsimile apparatus further comprises time designated setup information storing means for storing a designated time when the image data is transmitted from said facsimile apparatus to the other facsimile apparatus, said image file table further correlates the image data with the designated time.

26. A facsimile apparatus comprising:
scanning means for scanning a predetermined image on a document to generate an image signal representing the predetermined image;
encoder means, coupled to said scanning means, for encoding the image signal into image data;
control means, coupled to said scanning means and said encoder means, for controlling a connecting of said facsimile apparatus to another facsimile apparatus by at least one of transmitting and receiving predetermined protocol information so that the image data is transmitted between said control means and the other facsimile apparatus, the predetermined protocol information including identification information of said facsimile apparatus and the other facsimile apparatus;
plotter means, coupled to said control means, for plotting an image of image data transmitted from the other facsimile apparatuses to said control means;
a memory, coupled to said scanning means, which stores therein the image data generated by said scanning means;
image file table making means, coupled to said control means and memory, for automatically making an image file table in said memory by using at least the image data and the identification information of the other facsimile apparatus when the image data is transmitted from said facsimile apparatus to the other facsimile apparatus, and in which the image file table and the image data are correlated with the other facsimile apparatus; and
image managing means, coupled to said memory, for managing the image data by using the image file table.

27. A facsimile apparatus comprising:
scanning means for scanning a predetermined image on a document to generate an image signal representing the predetermined image;
encoder means, coupled to said scanning means, for encoding the image signal into image data:
control means, coupled to said scanning means and said encoder means, for controlling a connecting of said facsimile apparatus to another facsimile apparatus by at least one of transmitting and receiving predetermined protocol information so that the image data is transmitted between said control means and the other facsimile apparatus, the predetermined protocol information including identification information of said facsimile apparatus and the other facsimile apparatus;
plotter means, coupled to said control means, for plotting an image of image data transmitted from the other facsimile apparatuses to said control means;
a memory, coupled to said scanning means, which stores therein the image data generated by said scanning means and transmitted from the other facsimile apparatus to said facsimile apparatus;
image file table making means, coupled to said control means and the memory, for automatically making an image file table in said memory by using at least the image data and the identification information on the other facsimile apparatus when the image data is transmitted to and/or from said facsimile apparatus, in which the image file table and the image data are correlated with the other facsimile apparatus; and image managing means, coupled to said memory, for managing the image data by using the image file table.

* * * * *